United States Patent Office 3,021,344
Patented Feb. 13, 1962

3,021,344
TRIPHENYLMETHANE DYES
Donald Robert Baer, Wilmington, Del., assignor to E. I. du Pont de Nemours and Company, Wilmington, Del., a corporation of Delaware
No Drawing. Filed Aug. 19, 1959, Ser. No. 834,645
3 Claims. (Cl. 260—393)

Triphenylmethane dyes, which dyes are related to those of the present invention are frequently made by reacting benzaldehyde or its halogen derivatives with aromatic amines such as aniline or toluidine to form the leuco derivatives, followed by oxidation of the latter to the dye salts which are purified and isolated, preferably from aqueous solutions. For several years, certain triphenylmethane dyes have been sold for use in dyeing acrylic fibers; this is fully disclosed in U.S. Patent 2,764,466, German Patent 949,649 and A. P. Roy, American Dyestuff Reporter 41, 846 (1952), I.M.S. Walls, J. Soc. Dyers and Colourists 72, 261 (1956), H. Schoenefeld, Textil-u. Faserstofftechnik 6, 205 (1956), W. Beckmann and O. Glenz, Melliand Textilber, 38, 296 (1957), and B. Kramrisch, J. Soc. Dyers and Colourists 73, 85 (1957).

This invention relates to a few specific compounds of the triphenylmethane class, which compounds have been found to be outstanding dyes for acid-modified acrylic fiber.

The problem faced in this instance was that of producing a bright green-blue dye for acid-modified acrylic fiber. That is, a brighter green-blue dye than any available by the use of mixtures of known dyes. A secondary problem was that of combining, in one dye for said fiber, the quality of brightness with acceptable strength, lightfastness and pH shade stability.

It is an object of the present invention to provide a novel class of dyes. It is a further object of this invention to provide novel dyes for acid-modified acrylic fibers, which dyes have significant brightness, strength, lightfastness and shade stability against variations in pH. It is still a further object of this invention to provide a novel class of dyes which produce significant effects on acid-modified polyester fibers. These and other objects will become apparent in the following description and claims.

More specifically, the present invention is directed to a dye of the formula

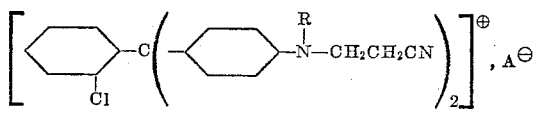

wherein R is a $C_{1-4}$ alkyl radical, and $A^\ominus$ is a water-solubilizing anion. A preferred dye is one wherein R is $CH_3$ and $A^\ominus$ is $ZnCl_3^-$; another preferred embodiment is where R is $CH_3$ and $A^\ominus$ is $Cl^\ominus$. The present invention also contemplates the process of dyeing acrylic fibers with a dye of the heretofore described structure.

When o-chlorobenzaldehyde (1 mole) is condensed with N-alkyl-N-(2-cyanoethyl)anilines (2 moles) in the presence of acidic catalysts, colorless triphenylmethane derivatives are formed. These colorless derivatives commonly called "leucos" are converted by oxidation in the presence of acids to greenish blue cationic dyes which are especially useful for dyeing acrylic fibers.

The "leucos" may be prepared in several ways known to the art. Some of these are illustrated in the following examples.

The "leucos," upon dissolving in a suitable acidic medium, may be oxidized to the cationic dye by adding the requisite amount of any of the oxidants known in the art, such as sodium nitrite, ferric chloride, manganese dioxide, or lead peroxide. The preferred procedure, according to the present invention, uses lead peroxide as illustrated in the examples.

Representative examples illustrating the present invention follow.

Example 1.—(Preparation of "leuco")

Into a round bottom flask fitted with a thermometer, an agitator and a reflux condenser, are added 28.1 parts (0.2 mole) of o-chlorobenzaldehyde, 67.2 parts (0.42 mole) of N-(2-cyanoethyl)-N-methylaniline, 36.7 parts of isopropanol, and 12 parts (0.2 mole) of urea. The mixture is stirred and 21.5 parts of 93% sulfuric acid are added gradually below 50° C. The temperature is raised to 82° to 83° C. and the isopropanol is refluxed gently for a four-hour period.

The reaction mass is transferred to a steam still, and ammonium hydroxide is added until there is a test for excess alkali. The isopropanol and any unreacted volatile intermediates are removed by steam distillation. Upon cooling, the supernatant liquid is decanted, leaving the "leuco" as a gummy or taffy-like mass.

Example 2.—(Preparation of "leuco")

To a flask, equipped as in the preceding example are added 14 parts (0.1 mole) of o-chlorobenzaldehyde, 35.1 parts (0.218 mole) of N-(2-cyanoethyl)-N-methylaniline, 140 parts of isopropanol, 8.6 parts of p-toluenesulfonic acid (0.05 mole), and 3 parts (0.05 mole) of urea. The mixture is stirred and heated at gentle reflux (80–82° C.) for eight hours. The reaction mass is poured into a steam still and the isopropanol and volatile intermediates are removed by steaming. Upon cooling the aqueous layer is decanted, leaving the "leuco" as a taffy-like mass.

Example 3.—(Preparation of "leuco")

If, in Example 1, one substitutes for the N-(2-cyanoethyl)-N-methylaniline, the molar equivalent of N-(2-cyanoethyl)-N-ethylaniline, or the molar equivalent of N-(n-butyl)-N-(2-cyanoethyl)aniline, one obtains the colorless gummy "leucos" of bis{p[(2-cyanoethyl)ethylamino]phenyl}(o-chlorophenyl)methane, and bis{p-[n-butyl-(2-cyanoethyl)amino]phenyl}(o-chlorophenyl)methane, respectively.

Example 4.—(Oxidation)

The "leuco" of Example 2, from 0.1 mole of o-chlorobenzaldehyde, is covered with 210 parts of isopropanol, 42 parts of 37% hydrochloric acid and 37.4 parts of glacial acetic acid. The mixture is warmed to 50° C. and stirred until all the "leuco" has dissolved. While stirring the solution at 50° C. a slurry of lead peroxide paste (0.143 mole) in 50 parts of isopropanol is added. The blue solution-slurry is stirred one hour at approximately 50° C. Then a solution of 33 parts of sodium sulfate dissolved in 140 parts of water is added and the oxidation mass is diluted further with 1500 parts of warm water. The dye solution and lead sulfate are stirred for one-half hour at 50±2° C. Two parts of activated charcoal are added, and the whole is diluted with 2400 parts of cold water. The mixture is cooled to 25° to 30° C. Insolubles, including lead sulfate, are removed by clarification through a pad of filter-aid (diatomaceous earth), and the total filtrate is collected, approximately 4700 parts.

To the clarified filtrate, a solution of 10 parts of $ZnCl_2$ in 10 parts of water and 4 parts of hydrochloric acid are added with stirring, followed by sifting in gradually 530 parts of NaCl. The precipitated dye is collected on a filter and washed with 10% NaCl solution. The filter cake is dried at 60° C. or lower. The product thus obtained dyes acid-modified acrylic fiber in strong, bright, green-blue shades from a hot, acidified aqueous dyebath.

Example 5.—(Oxidation)

In an alternate procedure the "leuco" of Example 2 is treated as follows. The "leuco" (as in Example 4) is covered with 60 parts of formic acid (88–90%), thereafter heated at 60°±5° C. and stirred until the "leuco" is completely dissolved. The solution is cooled to 30° to 35° C. and dilute sulfuric acid, previously prepared from 43 parts of 93% sulfuric acid and 140 parts of water, is added. The solution is stirred at 25° C. and 100 parts of lead peroxide paste (0.159 mole) in portions of 25 parts each are added at ten-minute intervals. The temperature of the oxidation should be preferably kept below 35° C. by means of a cooling water bath.

After completing the oxidation, 4 parts of a filter-aid (diatomaceous earth) are added, and the mass is diluted with 1300 parts of water. The resultant is stirred and heated at 48° to 50° C. for approximately one hour and then cooled to 25° to 30° C. The solution is clarified to remove lead sulfate and other insoluble material. The residue is washed with water to remove residual dye. The total clarified dye solution is run into a stirred slurry of 15 parts of zinc chloride and 300 parts of NaCl in 400 parts of water. The precipitated dye is filtered, and the filter cake is washed with approximately 1000 parts of 10% NaCl solution. The color is dried below 40° C. until nearly dry and then is dried to a constant weight at 60° C.

If equivalent amounts of the leucos derived from o-chlorobenzaldehyde (0.1 mole) and (1) N-(2-cyanoethyl)-N-ethylaniline or (2) N-(n-butyl)-N-(2-cyanoethyl)aniline are oxidized and isolated according to the methods of Example 4 or 5, similar dyes are obtained.

Several modifications in the condensation, oxidation and isolation steps are illustrated in the representative examples.

The green-blue dyes of this invention find significant utility in dyeing acid-modified acrylic fibers, that is, the sulfonate modified acrylic fibers such as those described by Andres and Sweeny in U.S. 2,837,500 and by Millhiser in U.S. 2,837,501, in strong bright shades having acceptable light-fastness and pH shade stability. These dyes may also be used to dye other fibers, such as acid-modified polyester fibers in either staple or filament form, that is, the linear condensation polyester fibers containing metal sulfonate groups, as described more fully in Belgian Patent No. 549,179, granted July 14, 1957.

The dye shades obtained on acrylic fibers, as a result of the present invention, are significantly brighter than those obtained by mixing available blue dyes for acrylic fibers, such as the oxazine blues with basic yellow dyes. Another significant advantage of the present invention is that the novel dyes may be stripped from the fiber with acid and "Textone" (sodium chlorite); this represents a significant contribution to the art when it is desired to re-dye the treated fabric or portions of said treated fabric.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A dye having the structure

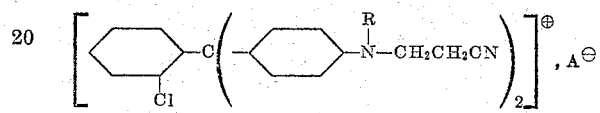

wherein R is a $C_{1-4}$ alkyl radical and $A^{\ominus}$ is a water-solubilizing anion.

2. A dye having a structure according to claim 1 wherein R is $CH_3$ and $A^{\ominus}$ is $ZnCl_3^-$.

3. A dye having a structure according to claim 1 wherein R is $CH_3$ and $A^{\ominus}$ is $Cl^{\ominus}$.

References Cited in the file of this patent

UNITED STATES PATENTS

| | | |
|---|---|---|
| 1,828,077 | Schulemann et al. | Oct. 20, 1931 |
| 2,304,946 | McNally et al. | Dec. 15, 1942 |
| 2,755,202 | Balon | July 17, 1956 |
| 2,755,203 | Stallmann | July 17, 1956 |
| 2,848,296 | Heller | Aug. 19, 1958 |
| 2,913,303 | Baumann et al. | Nov. 17, 1959 |

OTHER REFERENCES

Dorman: Amer. Dyest. Rep., July 5, 1954, pp. 431–433.

Colour Index, 2nd Ed., 1956, Soc. of Dyers and Colourists, vol. 1, p. 1631, entry C.I. 42500; ibid, vol. 3, p. 3354 entry C.I. 42500.

Wegmann, Melliand: April, 1958, pp. 408–414.